United States Patent
Kawasaki

(10) Patent No.: US 8,920,657 B2
(45) Date of Patent: Dec. 30, 2014

(54) GREY WATER DIVIDING AND TREATMENT

(75) Inventor: Hideki Kawasaki, Ritto (JP)

(73) Assignee: Empire Technology Development LLC, Wilmington, DE (US)

( * ) Notice: Subject to any disclaimer, the term of this patent is extended or adjusted under 35 U.S.C. 154(b) by 673 days.

(21) Appl. No.: 13/203,966

(22) PCT Filed: Apr. 18, 2011

(86) PCT No.: PCT/US2011/032903
§ 371 (c)(1),
(2), (4) Date: Aug. 30, 2011

(87) PCT Pub. No.: WO2012/144982
PCT Pub. Date: Oct. 26, 2012

(65) Prior Publication Data
US 2012/0261352 A1    Oct. 18, 2012

(51) Int. Cl.
C02F 1/66 (2006.01)
C02F 1/00 (2006.01)
C02F 103/00 (2006.01)

(52) U.S. Cl.
CPC .............. C02F 1/008 (2013.01); C02F 2303/02 (2013.01); C02F 2103/005 (2013.01); C02F 1/006 (2013.01); C02F 1/66 (2013.01); C02F 2001/007 (2013.01); C02F 2103/002 (2013.01); C02F 2209/005 (2013.01); C02F 2209/05 (2013.01); C02F 2209/06 (2013.01); C02F 2209/11 (2013.01)
USPC ........... 210/739; 210/743; 210/745; 210/746; 210/96.1; 210/103; 210/143; 210/294; 137/2; 137/118.01; 73/863.01; 73/863.31; 73/863.52; 73/863.56

(58) Field of Classification Search
None
See application file for complete search history.

(56) References Cited

U.S. PATENT DOCUMENTS

| | | | |
|---|---|---|---|
| 5,341,690 A | 8/1994 | Dawson et al. | |
| 6,143,185 A | 11/2000 | Tracy et al. | |
| 6,210,580 B1 | 4/2001 | Wickins | |
| 2010/0043129 A1* | 2/2010 | Platteel et al. | 4/300 |

FOREIGN PATENT DOCUMENTS

| | | |
|---|---|---|
| AU | 2008100542 | 7/2008 |
| CN | 101605941 A | 12/2009 |
| EP | 1 338 709 A2 | 8/2003 |
| JP | 2002-336883 A | 11/2002 |
| JP | 2003-275742 A | 9/2003 |
| WO | 2008/100132 A1 | 8/2008 |
| WO | WO 2010075617 A1 * | 7/2010 |

OTHER PUBLICATIONS

Derwent Abstract Accession No. 2003-665065, DE 10207162 A1 (Grohe & Co AG KG Friedrich) Aug. 28, 2003.
International search Report with Written Opinion for International Application No. PCT/US2011/032903 mailed on Jun. 1, 2011.

* cited by examiner

Primary Examiner — Terry Cecil
(74) Attorney, Agent, or Firm — Maschoff Brennan

(57) ABSTRACT

A grey water dividing and treatment system is provided. A drain system of the grey water dividing and treatment system receives grey water from a grey water producing source. A grey water dividing apparatus of the grey water dividing and treatment system divides the grey water received from the drain system into a number of cells, and determines a contamination level of each of the cells. Grey water treatment tanks of the grey water dividing and treatment system receive the grey water from the grey water dividing apparatus based on the determined contamination level of each of the cells and treat the grey water.

20 Claims, 6 Drawing Sheets

GREY WATER DIVIDING AND TREATMENT

BACKGROUND

Current grey water treatment systems are inefficient and do not produce much treated water that can be reused. For example, grey water produced in a house or in a large common carrier vehicle such as a plane, train, ship, or bus contains different levels of contamination. The grey water that is produced while water is running in a sink may be uncontaminated while the grey water that is produced from washing dishes may be highly contaminated.

However, current grey water treatment systems generally mix all of the grey water together regardless of its source or how contaminated it might be prior to treatment. The current grey water treatment systems must then treat all the grey water according to the treatment needs of the most contaminated grey water. This reduces the efficiency of the current grey water treatment systems and also increases the use of treatment reagents, which may be environmentally harmful.

SUMMARY

An illustrative embodiment disclosed herein relates to a grey water dividing apparatus. An input of the grey water dividing apparatus is capable of receiving grey water from a drainage system. One or more cells of the grey water dividing apparatus are coupled to the input and receive a portion of the grey water based on a fixed amount of time or based on a fixed amount of grey water. A processor of the grey water dividing apparatus determines the fixed amount of time or the fixed amount of grey water. A sensor unit of the grey water dividing apparatus is coupled to the one or more cells and determines a contamination level of the grey water in each of the one or more cells. An output of the grey water dividing apparatus is coupled to the one or more cells and provides the grey water to a grey water treatment system based on the determined contamination level of the grey water in each of the one or more cells.

An illustrative embodiment disclosed herein relates to a grey water dividing and treatment system. A drain system of the grey water dividing and treatment system receives grey water from a grey water producing source. A grey water dividing apparatus of the grey water dividing and treatment system divides the grey water received from the drain system into a number of cells, and determines a contamination level for the grey water in each of the cells. Grey water treatment tanks of the grey water dividing and treatment system receive the grey water from the grey water dividing apparatus based on the determined contamination level and treat the grey water.

An illustrative embodiment disclosed herein relates to a method for dividing and treating grey water. Grey water is received from a drainage system. The grey water is divided into one or more cells of a grey water dividing apparatus based on a fixed amount of time or based on a fixed amount of grey water. A contamination level of the grey water in each of the cells is determined based on one or more contamination characteristics. The grey water in each of the cells is provided to a grey water treatment tank based on the determined level of contamination.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
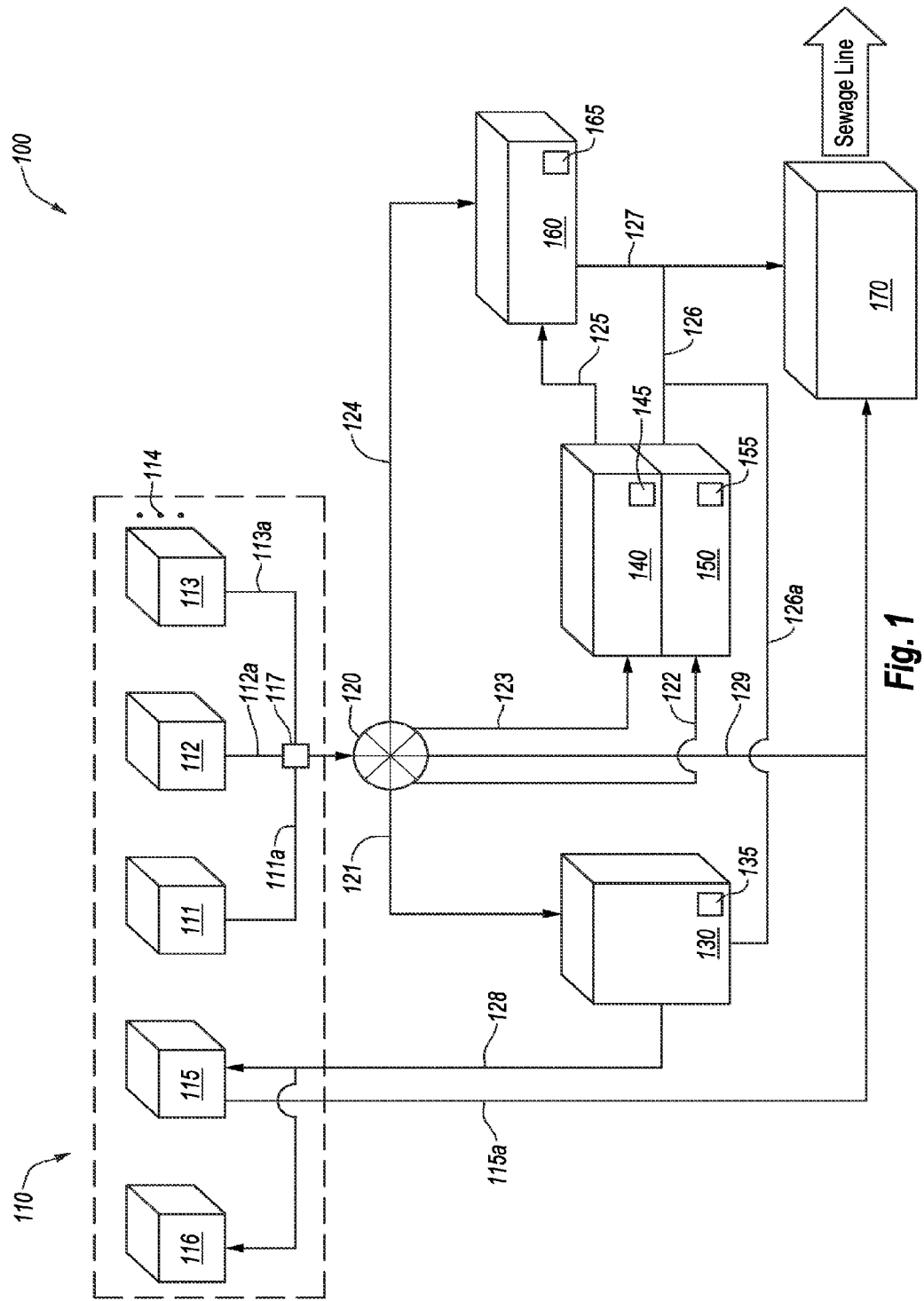
FIG. 1 is a schematic of a grey water dividing and treatment system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Embodiments disclosed herein relate to a grey water dividing and treatment system. The grey water dividing and treatment system includes a drain system that includes various sources that generate grey water and drains that drain the grey water sources. In the embodiments disclosed herein, "grey water" is defined to mean waste water that does not generally include contaminates related to human waste or industrial waste and that is from sources such as a bathtub, a shower, a household sink, a dishwasher, a clothes washer, or the like. The drain system can be a functional inlet into the grey water dividing and treatment system.

The drain system provides the grey water to a grey water dividing apparatus as an inlet. In some illustrative embodiments, the grey water dividing apparatus includes one or more cells that may hold a portion of the received grey water. The grey water dividing apparatus may also include or have access to a processor. The processor is configured to determine how much of the grey water each of the cells will receive based on a fixed amount of time of untreated grey water flow or a fixed amount (e.g., volume) of grey water. The fixed amount of time of untreated grey water flow or the fixed amount of grey water may be based on a relationship between contamination and time of flow of grey water and/or amount of grey water volume. In this way, the grey water that is received may be divided into the cells so that each cell includes an amount of grey water with different levels of contamination. The relationship between the time of flow and the amount of grey water can be based on the type of use, as described with relation to FIG. 3. For example, the first five minutes of grey water flow may be high contamination and the second five minutes can be low contamination. This allows the grey water divider (e.g., 120 discussed below) to operate based on a duration of time of grey water flow. On the other hand, the grey water divider may operate based on volume of grey water instead of the amount of time grey water flows at a particular level of contamination.

The grey water dividing apparatus may also include a sensor unit that is used to determine actual contamination of the grey water in each of the cells by measuring one or more contamination characteristics. The sensor unit can be operably coupled to a general processor that is part of the grey water dividing and treatment system, or can be operably coupled to an independent processor (e.g., a processor that is not a part of the system, but that may be operably coupled with the system) that can communicate with the general processor of the system. An independent processor may not be part of the system, but it can be configured to communicate with the components of the system. For example, data obtained from the sensor unit may be provided to an independent processor, such as a separate computing system, for processing, and the processed data can then be provided back to the grey water dividing and treatment system. In some illustrative embodiments, the contamination characteristics include, but are not limited to, turbidity, pH level, conductivity, absorption of light, and/or odor. The processor may use measured contamination levels from the sensor unit to determine one or more grey water treatment tanks of the grey water dividing and treatment system that the grey water in each of the cells should be sent to.

The treatment tanks receive the grey water from the grey water dividing apparatus and then may provide treatment for the grey water based on the contamination level. For example, in some illustrative embodiments, one of the grey water treatment tanks may be a water storage tank. When the processor and the sensor unit determine that the contamination level in a cell has a contamination low enough for reuse, the grey water in that cell may be provided to the water storage tank for reuse in flushing toilets or watering plants.

In some illustrative embodiments, the grey water treatment tank may be a deodorant tank that is used to remove odor from the grey water. When the processor and the sensor unit determine that the grey water in a cell has an odor level higher than a predetermined level, the grey water in that cell may be provided to the deodorant tank. The deodorant tank may then remove the odor from the grey water. In some embodiments, the treated grey water may be provided to a public sewage tank or septic tank, and in other embodiments, the treated grey water may be provided to the water storage tank for reuse. For example, the treated grey water can be reused before being reintroduced into the drain system and re-treated.

In some illustrative embodiments, the grey water treatment tank may be a pH adjustment tank that is used to adjust the pH level of the grey water. When the processor and the sensor unit determine that the grey water in a cell has a pH level higher than a predetermined level, the grey water in that cell may be provided to the pH adjustment tank. The pH adjustment tank may then adjust the pH level of the grey water. In some embodiments, the treated grey water may be provided to a public sewage tank and in other embodiments, the treated grey water may be provided to the water storage tank for reuse.

In some illustrative embodiments, the grey water treatment tank may be a sedimentation tank that is used to remove sediments from the grey water. When the processor and the sensor unit determine that the grey water in a cell has a turbidity level higher than a predetermined level, the grey water in that cell may be provided to the sedimentation tank. The sedimentation tank may then remove sediments from the grey water. The treated grey water may then be provided to a public sewage tank or to a water storage tank for reusing the treated grey water for suitable purposes.

In some illustrative embodiments, the grey water may be provided to a first grey water treatment tank for treatment by a first grey water treatment process, wherein the first grey water treatment process can be any grey water treatment process described here or otherwise known. The treated grey water which has been treated by the first grey water treatment process may then be provided to a second grey water treatment tank for further treatment by a second grey water treatment process. The first grey water treatment process and second grey water treatment process may be the same type of treatment process or may be a different type of treatment process. For example, the first grey water treatment tank may be configured for treating grey water to adjust the pH, and the second grey water treatment tank may further treat the grey water to adjust the pH or it may treat the grey water to remove sediment or other treatment process. In some embodiments, the double treated grey water may be provided to a public sewage tank and in other embodiments, the double treated grey water may be provided to the water storage tank for reuse.

Accordingly, the grey water dividing and treatment system may provide one or more advantages over existing grey water treatment systems. For example, since water is divided into separate cells based on contamination level according to some embodiments, the amount of reusable water is increased as the less contaminated grey water is not mixed with and thus contaminated by more contaminated grey water. Cleaner grey water is treated separately and may not be mixed with more contaminated grey water. The processed grey water that is cleaner may be used separately without being combined with other grey waters or the grey waters may be combined before reuse or disposal into public sewage tanks. Alternately or additionally, the grey water dividing and treatment system generally only sends the grey water in the cells to a grey water treatment tank if the grey water in the cell is contaminated in a manner that can be corrected or otherwise cleansed by the grey water treatment tank. Accordingly, treatment reagent use in the grey water treatment tanks is reduced as less grey water needs to be treated, thus improving the environmental impact of the grey water dividing and treatment system. Alternately or additionally, treating less grey water improves the treatment efficiency of the grey water treatment tanks and reduces the loading on the treatment system. Finally, treating less grey water reduces the needed capacity of the grey water treatment tanks, thus reducing the overall size of the grey water dividing and treatment system.

Several illustrative embodiments of respective aspects of the present disclosure are given below by way of example with reference to the accompanying figures. FIG. 1 is a schematic of a grey water dividing and treatment system 100, arranged in accordance with at least some embodiments described herein. The grey water dividing and treatment system 100 includes various elements that determine a contamination level for the grey water and then provide treatment to the grey water based on the contamination level. In some illustrative embodiments, the grey water dividing and treatment system 100 may be implemented in an airplane, a train, a bus, a ship, recreational vehicle, camper, trailer, or any other large vehicle or movable living space that produces grey water and that has sufficient room for the grey water dividing and treatment system 100. In other illustrative embodiments, the grey water dividing and treatment system 100 may be implemented in a house or any other type of building that produces grey water. As such, the grey water dividing and treatment system 100 can be configured to be portable or may be geographically fixed alone or in combination with a fixed structure.

The grey water dividing and treatment system 100 includes a drain system 110. The drain system 110 includes various grey water sources and their respective drains that drain any grey water produced by the grey water sources. As illustrated, the drain system 110 may include a first grey water source 111 and its accompanying drain 111a, a second grey water source 112 and its accompanying drain 112a, and a third grey water source 113 and its accompanying drain 113a. FIG. 1 also illustrates that any additional number of grey water sources and their respective drains 114 (shown by ellipses) may be included in the drain system 110.

In some embodiments, the first grey water source 111 may be a shower, a bathtub, or the like that is used primarily for washing the body of a human or another animal. The second grey water source 112 may be a household, kitchen or bathroom sink or some other device that is used primarily for washing dishes or hands, or used to get a drink of fresh water. The third grey water source 113 may be a dishwasher or clothes washer that is used primarily for washing dishes or clothes. It will be appreciated that in other embodiments, the grey water sources 111, 112, and 113 may be any type of device that generates grey water.

In some illustrative embodiments, the drain system 110 may also include a toilet 115 or similar device that is primarily used in relieving human waste. Since the waste water generated by the toilet 115 is generally highly contaminated with human waste, the toilet 115 will generally not be considered a grey water source. Accordingly, the waste water generated by the toilet 115 will generally be sent directly to a public sewage tank 170 via a pipe or drain 115a. However, in some embodiments, the waste water generated by the toilet 115 may be treated by the grey water dividing and treatment system 100.

For those embodiments where the grey water dividing and treatment system 100 is implemented in a house or other building, the drain system 110 may further include a sprinkler system 116 that may be used to water a lawn or other plants. As will be described in more detail to follow, grey water that is at least partially treated by the grey water dividing and treatment system 100 may be provided to the toilet 115 for reuse in flushing the toilet 115 and/or to the sprinkler system 116 for use in watering the lawn or other plants. Accordingly, grey water that is sufficiently clean may be reused without the need to send such grey water to the public sewage tank 170.

The grey water treatment system 110 also includes a grey water dividing apparatus 120. The grey water dividing apparatus 120 may receive the grey water from the drain system 110 via one or more inputs that are connected to the drain system 110. As will be explained in more detail to follow, the grey water dividing apparatus 120 includes multiple cells that each receive an amount of the grey water from the drain system 110 based on a fixed amount of time or based on a fixed amount of the grey water. Both of these fixed amounts may be determined by historical contamination levels. The grey water dividing apparatus 120 may be formed of a stainless steel, a plastic, or some other non-corrosive material. The grey water dividing apparatus 120 may have one or more sensors (not shown) configured to detect one or more types of grey water contamination conditions. The sensors can be integrated or removably couplable with the dividing apparatus and can be any type of sensor described herein.

One or more sensors and/or processors of the grey water dividing apparatus 120 may then be used to determine a contamination level for the grey water in each of the cells of the grey water dividing apparatus 120. Based on the determined contamination levels, the grey water is then provided to various grey water treatment tanks 130, 140, 150, and 160 of the grey water dividing and treatment system 100 as will be explained in more detail to follow.

Figure 2:
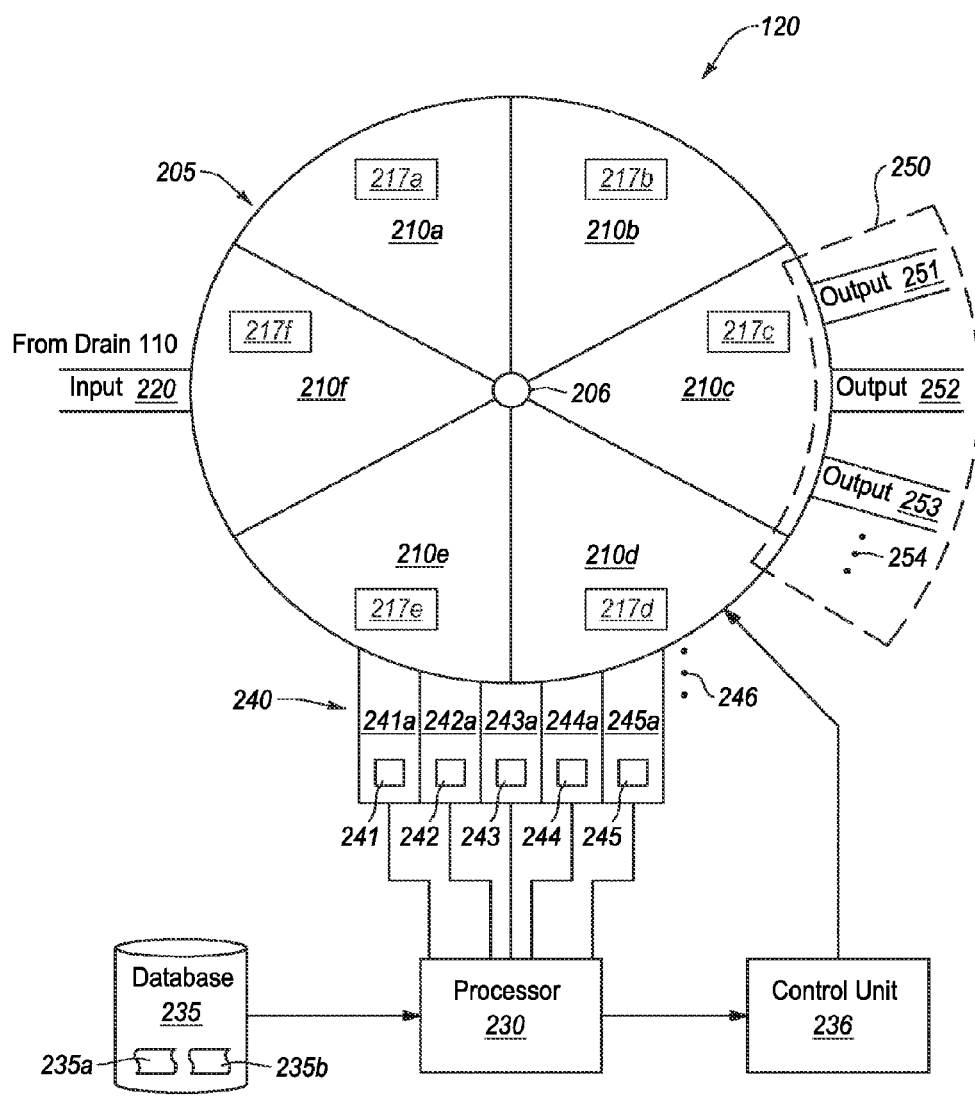
FIG. 2 shows a grey water dividing apparatus of the grey water dividing and treatment system of FIG. 1.

Attention is now made to FIG. 2, which shows an illustrative embodiment of the grey water dividing apparatus 120 of the grey water dividing and treatment system 100 of FIG. 1, arranged in accordance with at least some embodiments described herein. As shown, the grey water dividing apparatus 120 includes one or more cells $210a$, $210b$, $210c$, $210d$, $210e$, and $210f$, which may be commonly referred to hereinafter as cells 210. It will be appreciated that although FIG. 2 shows six cells 210 (i.e., cells $210a$, $210b$, $210c$, $210d$, $210e$, and $210f$), in other embodiments the grey water dividing apparatus 120 may include more or less than six cells 210. Thus, the embodiments disclosed herein are not limited to any particular number of cells 210.

The cells $210a$, $210b$, $210c$, $210d$, $210e$, and $210f$ may be constructed of a plastic, a non-corrosive metal, or any other suitable material that is able to hold grey water. In some embodiments, the cells $210a$, $210b$, $210c$, $210d$, $210e$, and $210f$ may all be the same size. In other embodiments, the cells $210a$, $210b$, $210c$, $210d$, $210e$, and $210f$ may all be different sizes or some may be the same size while other cells are different sizes. For example, cells $210a$, $210b$ and $210f$ may be one size while cell $210c$ is a second size and cells $210d$ and $210e$ are a third size.

In some illustrative embodiments, the size of the cells $210a$, $210b$, $210c$, $210d$, $210e$, and $210f$ is determined by the fixed amount of time or the fixed amount of grey water that each cell 210 will hold. Thus, the fixed amount of time (e.g., duration of time) of grey water flow that is to be directed to a particular cell 210 may be modulated depending on the cell 210 and volume of water related to the fixed amount of flow time. Also, the cell 210 size can determine the fixed amount of grey water volume that cell $210a$ may receive may be a smaller amount of grey water than the other cells 210 can receive. Accordingly, the embodiments disclosed herein are not limited by the size of the cells $210a$, $210b$, $210c$, $210d$, $210e$, and $210f$. The sizes of the cells 210 can physically vary or the amount of grey water the cells 210 can hold may be varied. While the size of cell $210a$ may be smaller than cell $210b$, the relative sizes may be varied as needed. Otherwise, the cells 210 can have fixed total volumes and the amount of grey water that can be received into the cells 210 can vary as needed, desired, or determined by the sensors.

In some illustrative embodiments, the sizes of the cells $210a$, $210b$, $210c$, $210d$, $210e$, and $210f$ are pre-determined, and each cell 210 can hold a pre-determined amount of grey water. The cells 210 may be of various physical sizes, so that the amount of grey water may dictate that cell $210a$ receives a smaller amount of grey water than the other cells 210. When the size of cells 210 vary, the amount of time of grey water flow that may reside within the different cells 210 may also vary.

The grey water dividing apparatus 120 includes at least one input 220. The input 220 can be connected to and receive the grey water from the drain system 110 or any other grey water input. The input 220 may then provide a portion of the received grey water to each of the cells $210a$, $210b$, $210c$, $210d$, $210e$, and $210f$. In some embodiments, the input 220 is a single input that is able to provide the grey water to each of the individual cells 210. In other embodiments, each of the cells 210a, 210b, 210c, 210d, 210e, and 210f may have its own input 220 that is connected to and receives the grey water from the drain system 110 for each individual cell 210. It will be appreciated, with the benefit of the present disclosure, that the input 220 may be located at any location on the grey water dividing apparatus 120.

As mentioned previously, each of the cells 210a, 210b, 210c, 210d, 210e, and 210f receives a portion of grey water from the input 220 based on a fixed amount of time of grey water flow or a fixed volume amount of grey water to be treated. Accordingly, a processor 230, which may be part of the grey water dividing apparatus 120 or that may be accessible by the grey water dividing apparatus 120, may be used to help determine the fixed amount of time and the fixed amount of grey water. The dividing apparatus 120 may be operably couplable with the processor 230 or integrated therewith. It will be appreciated that the processor 230 may be part of a computing system such as that described herein in FIG. 6 or it may be a standalone processor. The processor 230 may be operably coupled to the one or more sensors of the dividing apparatus 210.

Figure 3:
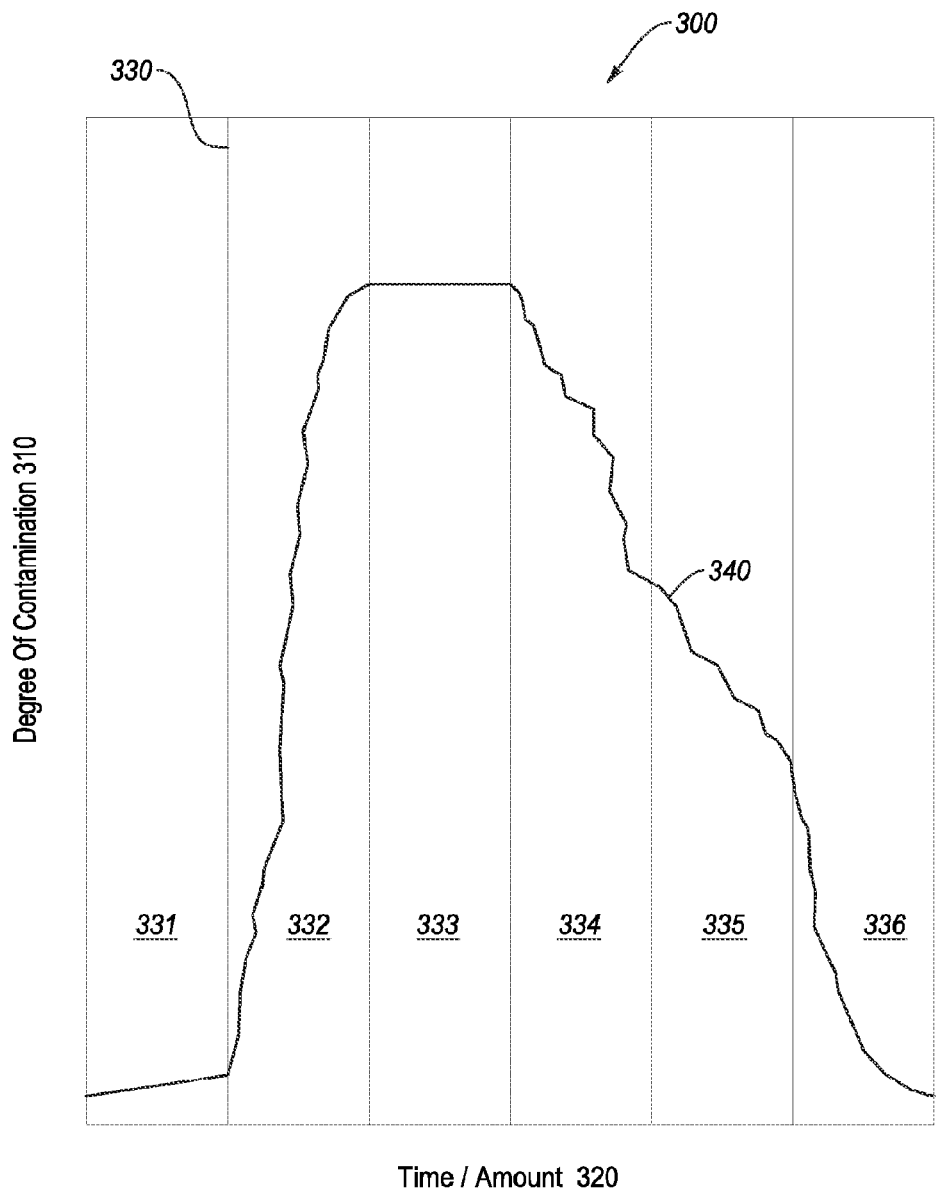
FIG. 3 is a graph illustrating a relationship between a degree of contamination of grey water and a fixed amount of time or a fixed amount of grey water.

Attention is given to FIG. 3, which is a graph 300 illustrating a relationship between a degree of contamination of grey water and a fixed amount of time of treatment or a fixed amount of grey water for treatment when washing a body in the grey water source 111 (i.e., a bathtub or a shower). As shown, the Y-axis 310 shows contamination levels and the X-axis 320 shows time or grey water amount. The graph 300 further shows vertical lines 330 that show time or water amount increments including increment 331, increment 332, increment 333, increment 334, increment 335, and increment 336.

The graph line 340 shows that as a person begins a shower in the first increment 331, the water has a very low level of contamination as the person is generally just getting his or her body wet. The graph line 340 then shows that the contamination level increases rapidly during the next few increments 332 and 333 as the person begins to clean his or her body with soaps and other cleaning reagents. Further, the soaps or other cleaning reagents cause dirt and other contaminants to be washed from the person's body. The graph line 340 further shows that as the person begins to rinse the soap or other cleaning reagents off of his or her body, the contamination level begins to decrease in the increment 334 and continues to decrease in the increments 335 and 336. Accordingly, the relationship shown in graph 300 may be used to determine the fixed amount of time and/or the fixed amount of grey water that is to be placed into the cells 210a, 210b, 210c, 210d, 210e, and 210f.

Returning to FIG. 2, the processor 230 may use the relationship shown in FIG. 3 for the grey water source 111 or similar relationships of contamination level versus time or amount of grey water for the grey water sources 112, 113, and 114 to help determine the fixed amount of grey water flow time or the fixed amount of grey water volume that are used to determine how much grey water is provided to each of the cells 210a, 210b, 210c, 210d, 210e, and 210f.

In some embodiments, the processor 230 may have access to a database 235, which may be part of or may be separate from the grey water dividing apparatus 120. The database 235 may be implemented using or on any type of reasonable non-volatile or volatile memory. The database 235 may store the relationships of contamination level versus time of grey water flow or amount of grey water volume, denoted as 235a, for the various grey water sources 111, 112, 113 and 114.

These relationships 235a may be based on historical contamination levels of grey water for a given amount of flow time or volume amount of grey water. With combined reference to FIGS. 1 and 2, in some embodiments, a sensor 117 that may be part of the drain system 110 is accessible by the processor 230 for data communication. The sensor 117 may inform the processor 230 which of the grey water sources 111, 112, 113, or 114 is generating the grey water so that the processor 230 may accesses the relationship 235a that is appropriate for the grey water source.

With reference to FIG. 2, each of the individual cells 210 can include a sensor 117. As such, cell 210a can include sensor 217a, cell 210b can include sensor 217b, cell 210c can include sensor 217c, cell 210d can include sensor 217d, cell 210e can include sensor 217e, and cell 210f can include sensor 217f. These sensors 217 may be individual sensors, sensor arrays that can sense multiple conditions, or sensor ports that can cooperate with a general sensor unit 240.

With combined reference to FIGS. 1-3, upon initialization of the grey water dividing and treatment system 100, the processor 230 may access the relationships 235a to determine how to divide the received grey water into each of the cells 210a, 210b, 210c, 210d, 210e, and 210f. For example, the processor 230 may determine that the cell 210a should receive an amount of grey water that is produced by grey water source 111 during the amount of time corresponding to the first increment 331. Alternatively, the cell 210a may receive a fixed amount of grey water that corresponds to the first increment 331. Accordingly, the grey water that is received by the cell 210a will have a low contamination level.

In like manner the processor 230 may determine that the cell 210b will receive an amount of grey water corresponding to the increment 332, cell 210c will receive an amount of grey water corresponding to the increment 333, cell 210d will receive an amount of grey water corresponding to the increment 334, cell 210e will receive an amount of grey water corresponding to the increment 335, and cell 210f will receive an amount of grey water corresponding to increment 336. The grey water placed in the cells 210b and 210c will have relatively high levels of contamination as they will receive grey water from the increments 332 and 333 corresponding to a high level of contamination while the grey water placed in the cells 210d, 210e, and 210f will have decreasing amounts of contamination as the grey water these cells receive corresponds to those increments 334, 335, and 336 showing decreasing contamination due to the person rinsing as previously described. Accordingly, dividing the received grey water based on the fixed amount of grey water flow time or fixed amount of grey water volume ensures that the grey water is divided according to contamination level. Further, dividing the grey water according the embodiments disclosed herein ensures that the less contaminated grey water is not mixed with the more contaminated grey water.

In some illustrative embodiments, the processor 230 may make use of a control unit 236 (FIG. 2) to help divide the grey water into the various cells 210. In such embodiments, the processor 230 may direct the control unit 236, which may be a motor, hydraulic system, or the like, to move or transport the water dividing apparatus 120 according to the fixed amount of grey water flow time or fixed amount of grey water volume so that each of the cells 210a, 210b, 210c, 210d, 210e, and 210f may receive their designated grey water from the input 220. For example, during a period corresponding to the first increment 331, the processor 230 may cause the control unit 236 to move the grey water dividing apparatus 120 so that cell 210a is accessible by the input 220. The cell 210a may then receive the grey water generated during the increment 331. In like manner, the processor 230 may cause the control unit 236 to move the grey water dividing apparatus 120 so that cells 210b, 210c, 210d, 210e, and 210f are accessible by the input 220 so that the cells 210b, 210c, 210d, 210e, and 210f may receive the grey water generated during the increments 332, 333, 334, 335, and 336 respectively.

As mentioned previously, once the grey water has been divided into the cells 210a, 210b, 210c, 210d, 210e, and 210f, a determination is made of the actual contamination level of the grey water in each cell 210 so that the grey water may be efficiently treated by the grey water dividing and treatment system 100. Accordingly, the grey water dividing apparatus 120 has access to a sensor unit 240. In some illustrative embodiments, the sensor unit 240 is part of the grey water dividing apparatus 120. In other embodiments, the sensor unit 240 is separate from, but accessible by, the grey water dividing apparatus 120. Alternately or additionally, the sensor unit 240 may include the processor 230 or be operably coupled therewith. Also the sensor unit 240 may be operably couplable with the individual sensors 217a-f.

The sensor unit 240 may receive the grey water or information regarding the grey water from one or more of the cells 210a, 210b, 210c, 210d, 210e, and 210f. Once the grey water or grey water information is received from one or more of the cells 210, the sensor unit 240 determines the contamination level of the grey water by measuring one or more contamination characteristics including turbidity, pH level, conductivity, absorption of light or odor of the grey water. It will be appreciated that the sensor unit 240 may measure additional contamination characteristics as circumstances warrant. It will be noted that measuring the absorption of light includes measuring IR light, UV light, visible light, or other light bands as circumstances warrant. While the sensor unit 240 may be configured to receive grey water from the cells 210, the sensor unit 240 may merely receive grey water information from the sensors 217a-f. Also, the sensor unit 240 can be used to monitor grey water that is within one or more of the cells 210a-f. Alternatively, the sensor unit 240 can pull grey water from one of the cells 210, analyze the grey water, and then reintroduce the grey water back into the same cell 210.

In some illustrative embodiments, the sensor unit 240 includes a single sensor that is able to measure all of the contamination characteristics or a subset thereof. In other illustrative embodiments, however, the sensor unit 240 may include multiple sensors 241, 242, 243, 244, and 245 that each measures a different contamination characteristic. FIG. 2 also illustrates that any additional number of sensors 246 (shown by ellipses) may be included as part of the sensor unit 240.

For example, the sensor 241 may be a turbidity sensor that may measure a turbidity of the grey water. The sensor 242 may be a pH meter that may measure a pH level of the grey water. The sensor 243 may be a conductance meter that may measure conductivity of the grey water. The sensor 244 may be an odor meter that may measure an odor of the grey water. The sensor 245 may be a spectrometer that may measure light absorption of the grey water. The sensor 246 may be a sensor that is able to measure one or more of any additional contamination characteristics that may be measured by the sensor unit 240.

In some illustrative embodiments, the grey water dividing apparatus 120 includes or is operably coupleable with one or more tubes 241a, 242a, 243a, 244a, and 245a that may be part of the sensor unit 240. As seen in FIG. 2, the tubes 241a, 242a, 243a, 244a, and 245a can be operably connected to the cells 210a, 210b, 210c, 210d, 210e, and 210f. In addition, the tubes 241a, 242a, 243a, 244a, and 245a can be operably connected to sensors 241, 242, 243, 244, and 245 respectively. When each of the cells 210a, 210b, 210c, 210d, 210e, and 210f becomes adjacent the tubes 241a, 242a, 243a, 244a, and 245a, the tubes 241a, 242a, 243a, 244a, and 245a are able to sample a portion of the grey water in each of the cells 210a, 210b, 210c, 210d, 210e, and 210f and provide the sample to the sensors 241, 242, 243, 244, and 245. Once the contamination measurements have been made by the sensors 241, 242, 243, 244, and 245, the tubes 241a, 242a, 243a, 244a, and 245a may return the sampled grey water to the cells 210a, 210b, 210c, 210d, 210e, and 210f.

When the sensor unit 240 is a single sensor as previously discussed, then a single tube, such as tube 241a, may be implemented for the single sensor. In this way, the single sensor implementation of sensor unit 240 is able to sample grey water from and then return the sampled grey water to each of the cells 210a, 210b, 210c, 210d, 210e, and 210f.

In some illustrative embodiments, at least some of the tubes 241a, 242a, 243a, 244a, and 245a may be formed from polymethacylic acid, styrene, or some other light transparent material. In other embodiments, at least some of the tubes 241a, 242a, 243a, 244a, and 245a may be formed from quartz. In still other embodiments, the tubes 241a, 242a, 243a, 244a, and 245a may be formed from any combination of materials.

In some illustrative embodiments as shown in FIG. 2, the grey water dividing apparatus 120 may be implemented as a round column 205 that is separated into the one or more cells 210a, 210b, 210c, 210d, 210e, and 210f. The round column 205 may have an axis 206 in a center that rotates when each of the cells 210a, 210b, 210c, 210d, 210e, and 210f is filled with the grey water from the input 220. Implementing the grey water dividing apparatus 120 as the round column 205 allows the weight of the grey water in each of the cells 210a, 210b, 210c, 210d, 210e, and 210f to contribute to the rotation of the round column 205. This contribution helps the control unit 236 when rotating the grey water dividing apparatus 120.

As will be appreciated, when the round column 205 is rotated by the control unit 236 and by the received grey water, each of the cells 210a, 210b, 210c, 210d, 210e, and 210f may be transported or moved to the sensor unit 240. This allows for the grey water in each of the cells 210a, 210b, 210c, 210d, 210e, and 210f to be sampled. For example, the grey water in the cell 210a may be sampled by the sensor unit 240 and then returned to the cell 210a as described. Upon completion, the control unit 236 along with the weight of the grey water rotates the round column 205 to transport or move the cell 210b if the rotation is counterclockwise or the cell 210f if the rotation is clockwise to the sensor unit 240 so that the grey water in the cell 210b or 210f may also be sampled. In this way, round column 205 is able to rotate so that all of the cells 210 may have their grey water sampled.

The grey water dividing apparatus 120 also includes at least one output 250 that can be operably coupled to or useable by the cells 210a, 210b, 210c, 210d, 210e, and 210f. The output 250 may provide the grey water in each of the cells 210a, 210b, 210c, 210d, 210e, and 210f to one or more grey water treatment tanks 130, 140, 150, and 160 of the grey water dividing and treatment system 100 based on the level of contamination of the grey water in each cell. The output 250 may be located at any location on the grey water dividing apparatus 120. As will be explained in more detail to follow, because the grey water in each of the cells 210a, 210b, 210c, 210d, 210e, and 210f will generally have a different contamination level, the grey water can be treated in a more efficient manner. The grey water that is less contaminated may require less treatment than the grey water that is more contaminated. In this manner, treatment resources can be allocated based on the treatment needs of the grey water. Consequently, grey water that does not need a particular type of treatment will not receive that treatment, thus saving on treatment resources.

In some illustrative embodiments, the output 250 may include multiple outputs 251, 252, and 253. FIG. 2 also illustrates that any additional number of outputs 254 (shown by ellipses) may be included as part of the grey water dividing apparatus 120. The multiple outlets may be used to connect the grey water dividing apparatus 120 with different ones of the grey water treatment tanks 130, 140, 150, and 160 of the grey water dividing and treatment system 100. Thus, the output 251 may connect the grey water dividing apparatus 120 with one grey water treatment tank of the grey water dividing and treatment system 100, for example grey water treatment tank 130, the output 252 may connect the grey water dividing apparatus 120 with a different grey water treatment tank of the grey water dividing and treatment system 100, for example grey water treatment tank 140, and the output 253 may connect the grey water dividing apparatus 120 with still another grey water treatment tank of the grey water dividing and treatment system 100, for example grey water treatment tank 150.

As mentioned, the grey water in the cells 210*a*, 210*b*, 210*c*, 210*d*, 210*e*, and 210*f* is provided to a certain grey water treatment tank based on the level of contamination as well as the type(s) of contamination. In some illustrative embodiments, the processor 230 receives the contamination levels for each of the cells 210*a*, 210*b*, 210*c*, 210*d*, 210*e*, and 210*f* from sensor unit 240. Based on the contamination levels, the processor 230 causes the control unit 236 to transport or move the cells 210*a*, 210*b*, 210*c*, 210*d*, 210*e*, and 210*f* to the outputs 251, 252, 253, or 254 that connect the cells 210*a*, 210*b*, 210*c*, 210*d*, 210*e*, and 210*f* to the grey water treatment tanks 130, 140, 150, and 160 that are appropriate for the contamination level of each of the cells 210*a*, 210*b*, 210*c*, 210*d*, 210*e*, and 210*f*. For example, the processor 230 may cause the control unit 236 to transport or move the cell 210*a* to the output 251 for connection to the grey water treatment tank 120, to transport or move the cell 210*b* to the output 252 for connection to the grey water treatment tank 130, to transport or move the cell 210*c* to the output 253 for connection to the grey water treatment tank 140. The processor 230 may also cause the control unit 236 to transport or move the cells 210*d*, 210*e*, and 210*f* to the output 250 that is appropriate for their respective contamination levels.

In some illustrative embodiments, the database 235 may store predetermined values 235*b* for the various contamination characteristics including, but not limited to, turbidity, pH level, conductivity, absorption of light and odor of the grey water that are measured by the sensor unit 240. For example, the predetermined values 235*b* may include a predetermined turbidity value, a predetermined pH level, a predetermined conductivity value, a predetermined absorption of light value, and a predetermined odor value. The predetermined values 235*b* may be based on local government or scientific water treatment regulations. The processor 230 may receive the measured contamination characteristic values for a cell 210 from the sensor unit 240 and may then compare each measured value with the respective predetermined value. The comparison may help the processor 230 to determine which of the grey water treatment tanks 130, 140, 150, and 160 the grey water in the cell 210 should be sent to. In this manner, the grey water dividing apparatus 120 is able to determine the contamination levels of the grey water in the cells 210*a*, 210*b*, 210*c*, 210*d*, 210*e*, and 210*f* based on local government or scientific water treatment regulations.

As discussed previously, the processor 230 determines the fixed amount of time of grey water flow or the fixed amount of grey water volume that is used to determine the volume amounts of grey water initially provided to the cells 210*a*, 210*b*, 210*c*, 210*d*, 210*e*, and 210*f*. As also mentioned, initially the fixed amount of time or the fixed amount of grey water may be based on the historical relationships 235*a* stored in database 235. In some illustrative embodiments, the processor 230 may periodically update the fixed amount of time or the fixed amount of grey water based on the determined contamination level of the grey water in each of the cells 210*a*, 210*b*, 210*c*, 210*d*, 210*e*, and 210*f*. That is, as the processor 230 receives the contamination levels from the sensor unit 240, the processor 230 is able to determine if the fixed amount of time or the fixed amount of grey water is adequately dividing the grey water based on the expected contamination levels. If the processor 230 determines that updates are needed, the processor 230 may make the appropriate changes to the relationships 235*a* in the database 235. In this way, the processor 230 is able to constantly ensure that the cells 210*a*, 210*b*, 210*c*, 210*d*, 210*e*, and 210*f* receive water that has been properly divided based on the expected contamination levels.

Attention is again given to FIG. 1, which shows that the grey water dividing and treatment system 100 includes the grey water treatment tanks 130, 140, 150, and 160 and the public sewage tank 170. In some illustrative embodiments, the grey water treatment tanks 130, 140, 150, and 160 may be formed of a stainless steel, a plastic, or any other non-corrosive material. In addition, the grey water treatment tanks 130, 140, 150, and 160 may be any dimension necessary to perform their various functions while still fitting in the home or vehicle they are implemented in. The public sewage tank 170 may be any reasonable sewage tank that is connected to a public sewage system.

In some illustrative embodiments, grey water in one of the cells 210*a*, 210*b*, 210*c*, 210*d*, 210*e*, and 210*f* may be provided directly to the pubic sewage tank via a pipe or connection 129. This may occur when the grey water dividing and treatment system 100 is not fully functional or when one or more of the grey water treatment tanks 130, 140, 150, and 160 is not able to handle any more grey water for treatment. It is noted that the pipe or connection 129, as well as the other pipes or connections that will be described hereinafter, may be any type of pipe or connection or systems of multiple pipes and connections as circumstances warrant.

The grey water treatment tank 130 may be a water storage tank, hereinafter also referred to as water storage tank 130 for ease of explanation, that may receive grey water from the grey water dividing apparatus 120 when the grey water dividing apparatus 120 determines that the grey water in one of the cells 210*a*, 210*b*, 210*c*, 210*d*, 210*e*, and 210*f* has a contamination level low enough that the grey water can be safely reused. The grey water that is transferred to the water storage tank 130 can be stored for a desired or needed amount of time before being reused. For example, since as discussed previously the grey water received by the cell 210*a* may be generated by the grey water source 111 during the first increment 331, it is likely that the grey water dividing apparatus 120 (i.e., the processor 230 and the sensor unit 240) would determine that the grey water in cell 210*a* has a low enough contamination level to be safely reused. In such case, the grey water in the cell 210*a* is provided to the water storage tank 130 for reuse via a pipe or connection 121 that connects the water storage tank 130 to the grey water dividing apparatus 120. The grey water that is stored in the water storage tank 130 may then be provided to the toilet 115 for reuse in flushing the toilet. In addition, the grey water stored in the water storage tank 130 may be provided to the sprinkler system 116 for use in watering a lawn or other plants of a building that implements the grey water dividing and treatment system 100. As illustrated, the grey water stored in the water storage tank 130 is provided to the toilet 115 and to the sprinkler system 116 via a pipe or connection 128 that connects the water storage tank 130 with the toilet 115 and/or the sprinkler system 116.

The grey water treatment tank 140 may be a deodorant tank, hereinafter referred to as deodorant tank 140 for ease of explanation. The deodorant tank 140 is configured to remove odor so as to be capable of treating or reducing the odor of the grey water. The deodorant tank 140 may also store the deodorized grey water for a desired or needed period of time. The deodorant tank 140 may receive grey water from the grey water dividing apparatus 120 when the grey water dividing apparatus 120 determines that the grey water in one of the cells 210a, 210b, 210c, 210d, 210e, and 210f has an odor that is higher than a predetermined acceptable level. For example, the processor 230 may determine that the odor level in the grey water in one of the cells 210a, 210b, 210c, 210d, 210e, and 210f is higher than the predetermined odor level 235b. The grey water dividing apparatus 120 may send the grey water from the cells 210a, 210b, 210c, 210d, 210e, and 210f with the high odor level to the deodorant tank 140 via the pipe or connection 123. The deodorant tank 140 may then treat the odor of the received grey water so that the odor level is in accordance with local government and/or scientific water treatment regulations.

The deodorant tank 140 can be configured with various components to promote the removal of odors and noxious gases. The various components can range from heating elements to increase the temperature of the grey water to a level that vaporizes or increases vaporization of odorous chemicals into a gas that can be vented or otherwise separated from the liquid water. Often, the heating element can increase the temperature to a level above the vaporization temperature of the odorous chemicals and that is below the boiling point of water. However, higher temperatures can be useful when some grey water can also be vaporized without too much water loss. The deodorant tank 140 may also have odor-absorbing components such as highly porous and absorbing materials including activated carbon, baking soda, clays, bentonite, earth bleaches, or the like. Sonicators can also be used to evolve odorous chemicals from the grey water.

In one embodiment, the deodorant tank 140 may also have odor-resolving components that can reduce the odor released by the contents in the deodorant tank. The odor-resolving components can include air or ozone bubbling mechanisms to help evolve odors from the contents, microorganisms to digest the contents, electrode for electrochemical decomposition of the contents, or the like.

The grey water treatment tank 150 may be a pH adjustment tank, hereinafter referred to as pH adjustment tank 150 for ease of explanation, which treats the pH level of grey water. The pH adjustment tank 150 may receive grey water from the grey water dividing apparatus 120 when the grey water dividing apparatus 120 determines that the grey water in one of the cells 210a, 210b, 210c, 210d, 210e, and 210f has a pH level that is higher than a predetermined acceptable level. For example, the processor 230 may determine that pH level in the grey water in one of the cells 210a, 210b, 210c, 210d, 210e, and 210f is higher than the predetermined pH level 235b. The grey water dividing apparatus 120 may send the grey water from the cells 210a, 210b, 210c, 210d, 210e, and 210f with the high pH level to the pH adjustment tank 150 via the pipe or connection 122. The pH adjustment tank 150 may then adjust the pH level of the received grey water so that the pH level is in accordance with local government and/or scientific water treatment regulations. Often, the pH is adjusted to around neutrality.

The pH adjustment tank 150 can include various acids and/or bases that can be selectively introduced into the grey water in order to modulate the pH toward neutrality or toward being more acidic or more basic, as desired. In fact, the pH can be changed to be any desired pH by selectively adding acid and/or base, such as strong or weak acids or bases. The acids and/or bases can be the same or similar to the chemicals that are used for buffer solutions. Sodium bicarbonate is a suitable example of a chemical that can alter pH toward neutrality. Other examples include: HCl and sodium citrate can adjust the pH to about 1-5; citric acid and sodium citrate can adjust the pH to about 2.5-5.6; acetic acid and sodium acetate can adjust the pH to about 3.7-5.6; $K_2HPO_4$ and $KH_2PO_4$ can adjust the pH to about 5.8-8; $NaHPO_4$ and $NaH_2PO_4$ can adjust the pH to about 6-7.5; and borax and sodium hydroxide can adjust the pH to about 9.2-11; tartaric acid and sodium tartrate can be used to adjust the pH to about 2.9-4.3; lactic acid and sodium lactate can be used to adjust the pH to about 2.3-5.3; succinic acid and Boric acid can be used to adjust the pH to about 3.0-5.8; HCl and borax can be used to adjust the pH to about 7.5-9.2; Boric acid and sodium carbonate can be used to adjust the pH to about 7.5-11.0.

The grey water treatment tank 160 may be a sedimentation tank, hereinafter referred to as sedimentation tank 160 for ease of explanation, which treats turbidity in grey water. The sedimentation tank 160 may receive grey water from the grey water dividing apparatus 120 when the grey water dividing apparatus 120 determines that the grey water in one of the cells 210a, 210b, 210c, 210d, 210e, and 210f has a turbidity level that is higher than a predetermined acceptable level. For example, the processor 230 may determine that turbidity level in the grey water in one of the cells 210a, 210b, 210c, 210d, 210e, and 210f is higher than the predetermined turbidity level 235b. The grey water dividing apparatus 120 may send the grey water from the cells 210a, 210b, 210c, 210d, 210e, and 210f with the high turbidity level to the sedimentation tank 160 via the pipe or connection 124. The sedimentation tank 160 may then remove any sediment in the received grey water so that the turbidity level is in accordance with local government and/or scientific water treatment regulations.

The sedimentation tank 160 can be configured to settle out suspended solids from the grey water under the influence of gravity. That is, gravity can be used to settle solids from the grey water. Forced gravity by centrifugation may also be used so that the force generated forces the solids to separate from the liquids of the grey water. The sedimentation tank can be configured to settle solids that have a size larger than or about 10 microns or lower to about 1 nm. Also, the sedimentation tank 160 can be configured to settle colloids having a particle size from about 0.001 nm to about 1 nm. Additionally, the sedimentation tank 160 can be configured for one of the following sedimentation processes: type 1 includes dilutes, non-flocculent, and free-settling particles where every particle settles independently; type 2 includes dilute and flocculent particles where particles can flocculate as they settle; type 3 includes concentrated suspensions and zone setline with sludge thickening; type 4 includes concentrated suspensions and compression with sludge thickening. The sedimentation tank can be sized depending on the time and length needed for optimal settling of solids and colloids from the grey water.

The grey water that has been treated by the deodorant tank 140 and/or the pH adjustment tank 150 may be provided to the public sewage tank 170 for transportation to the pubic sewage system via a pipe or connection 126. Likewise, the grey water that has been treated by the sedimentation tank 160 may be provided to the public sewage tank 170 for transportation to the pubic sewage system via a pipe or connection 127.

In some embodiments, the grey water that is treated by one grey water treatment tank is not sent directly to the public sewage tank 170. Rather, in such embodiments two or more of the grey water treatment tanks are connected to each other by piping or the like that is able to transport the grey water between the two or more grey water treatment tanks. For example, as illustrated in FIG. 1, the grey water dividing apparatus 120 may provide grey water from one of the cells 210a, 210b, 210c, 210d, 210e, and 210f to the deodorant tank 140 via the pipe or connection 123 for odor treatment. Upon completion of the odor treatment, the deodorant tank 140 may then provide the treated grey water to the sedimentation tank 160 for further turbidity treatment. The sedimentation tank 160 may then provide the grey water that has been treated in both the deodorant tank 140 and the sedimentation tank 160 to the public sewage tank 170 via the pipe or connection 127.

Likewise, as also illustrated in FIG. 1, the grey water dividing apparatus 120 may provide grey water from one of the cells 210a, 210b, 210c, 210d, 210e, and 210f to the deodorant tank 140 via the pipe or connection 123 for odor treatment. Upon completion of the odor treatment, the deodorant tank 140 may then provide the treated grey water to the pH adjustment tank 150 for further pH level adjustment. The pH adjustment tank 150 may then provide the grey water that has been treated in both the deodorant tank 140 and the pH adjustment tank 150 to the public sewage tank 170 via the pipe or connection 126.

In some embodiments where local regulations allow, the grey water that has been treated by both the deodorant tank 140 and the pH adjustment tank 150 may be deemed safe enough to be reused. Accordingly, in such embodiments, the grey water that has been treated in both the deodorant tank 140 and the pH adjustment tank 150 may be provided to the water storage tank 130 via a pipe or connection 126a for reuse as previously described.

In some illustrative embodiments, one or more of the grey water treatment tanks 130, 140, 150, and 160 may include a sensor that is able to further measure a contamination characteristic of the grey water received by the one or more grey water treatment tanks 130, 140, 150, and 160. For example, the grey water treatment tanks 130, 140, 150, and 160 may include a sensor 135, 145, 155, and 165 respectively that is able to measure one or more contamination characteristics including one or more of turbidity, pH level, conductivity, absorption of light and odor. In this way, there is an additional way to determine if the grey water treated in the grey water treatment tanks 130, 140, 150, and 160 meets local regulations before being reused or sent to the public sewage system.

In some embodiments, the sensor that is included in the grey water treatment tanks 130, 140, 150, and 160 may be a sensor that measures the specific type of contamination the grey water treatment tank is designed to treat. For example, the sensor 145 may be an odor meter that measures odor of the grey water in the deodorant tank 140, the sensor 155 may be a pH level meter that measures the pH level of the grey water in the pH adjustment tank 150, and the sensor 165 may be a turbidity meter that measures turbidity of the grey water in the sedimentation tank 160.

Figure 4:
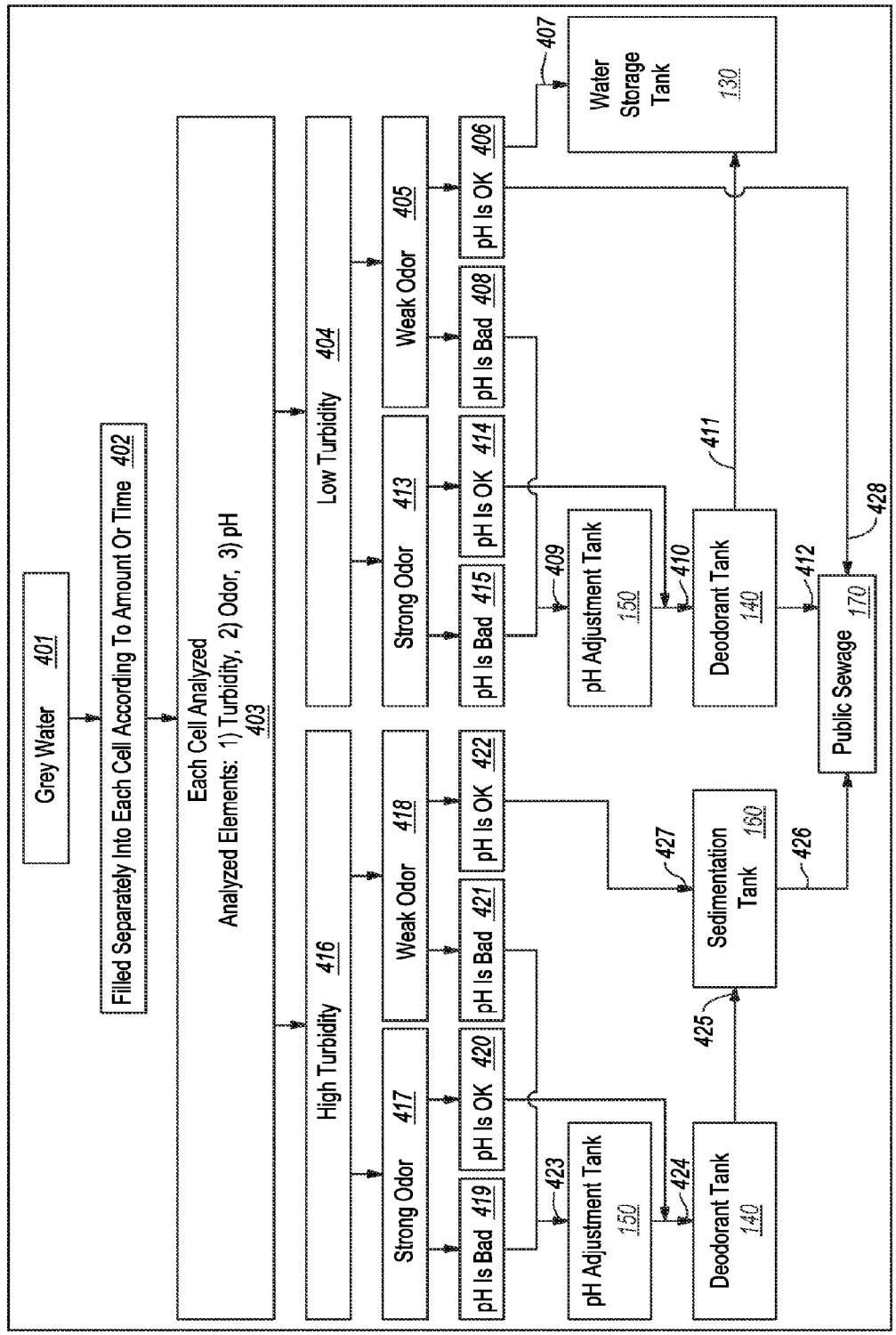
FIG. 4 is a diagram of a treatment flow for treating grey water using the grey water dividing and treatment system of FIG. 1.

FIG. 4 is a diagram of a treatment flow 400 for treating grey water using the grey water dividing and treatment system of FIG. 1, arranged in accordance with at least some embodiments described herein. The treatment flow 400 will be described with reference to the grey water dividing and treatment system 100 described in FIG. 1 and to the grey water dividing apparatus 120 described in relation to FIG. 2. At block 401 (Grey Water), grey water is received by the drain system 110 from the grey water sources 111, 112, 113, or 114 and provided to the grey water dividing apparatus 120.

At block 402 (Filled Separately Into Each Cell According To Amount Or Time), the received grey water is divided into the cells 210a, 210b, 210c, 210d, 210e and 210f according to the fixed amount of time or the fixed amount of grey water as previously described.

At block 403 (Each Cell Analyzed), each of the cells 210a, 210b, 210c, 210d, 210e and 210f are analyzed by the processor 230 and the sensor unit 240 to determine their contamination levels. For purposes of the example treatment flow 400, only the "Analyzed Elements" including, but not limited to, 1) turbidity, 2) odor, and 3) pH level contamination characteristics are analyzed when determining the contamination level. It will be appreciated that other contamination characteristics may also be analyzed as circumstances warrant.

In some illustrative embodiments, at blocks 404 (Low Turbidity), 405 (Weak Odor), and 406 (pH Is OK), the processor 230 and the sensor unit 240 may determine that the grey water in one of the cells 210 has low turbidity, a weak odor, and a low pH level respectively. The processor 230 may then cause the grey water dividing apparatus 120 to provide the grey water to water storage tank 130 as denoted at 407 because the contamination level of the grey water is low enough for reuse. Alternatively, the processor 230 may cause the grey water dividing apparatus to provide the grey water directly to the public sewage tank 170 as denoted at 428 in those embodiments where the grey water dividing and treatment system 100 is not available as previously described.

In some illustrative embodiments, at block 404 and 405, the processor 230 and the sensor unit 240 may determine that the grey water in one of the cells 210 has low turbidity and weak odor respectively. At block 408 (pH Is Bad), the processor 230 and the sensor unit 240 may determine that the grey water has a pH level that is above the acceptable level. The processor 230 may then cause the grey water dividing apparatus 120 to provide the grey water to the pH adjustment tank 150 as denoted at 409 for pH treatment. In these and other embodiments, after being treated in the pH adjustment tank 150, the treated grey water is then provided to the deodorant tank 140 as denoted at 410 even though the grey water has a weak odor. The grey water may then be provided to the public sewage tank 170 as denoted 412. Alternatively, the treated grey water may be provided to the water storage tank 130 as denoted at 411 in those circumstances where local government and/or scientific regulations allow for the reuse of treated grey water.

In some illustrative embodiments, at blocks 404, 413 (Strong Odor), and 414 (pH Is OK), the processor 230 and the sensor unit 240 may determine that the grey water in one of the cells 210 has low turbidity, a strong odor, and a low pH level respectively. The processor 230 may then cause the grey water dividing apparatus 120 to provide the grey water to the deodorant tank 140 as denoted at 410 for odor treatment. The treated grey water may then be provided to the public sewage tank 170 as denoted 412. Alternatively, the treated grey water may be provided to the water storage tank 130 as denoted at 411 in those circumstances where local government and/or scientific regulations allow for the reuse of treated grey water.

In some illustrative embodiments, at blocks 404, 413 and 415 (pH Is Bad), the processor 230 and the sensor unit 240 may determine that the grey water in one of the cells 210 has low turbidity, a strong odor, and a high pH level respectively. The processor 230 may then cause the grey water dividing apparatus 120 to provide the grey water to the pH adjustment tank 150 as denoted at 409 for pH treatment. The treated grey water may then be provided to the deodorant tank 140 as denoted at 410 for odor treatment. The treated grey water may then be provided to the public sewage tank 170 as denoted 412. Alternatively, the treated grey water may be provided to the water storage tank 130 as denoted at 411 in those circumstances where local government and/or scientific regulations allow for the reuse of treated grey water.

In some illustrative embodiments, at blocks 416 (High Turbidity), 418 (Weak Odor), 422 (pH Is OK), the processor 230 and the sensor unit 240 may determine that the grey water in one of the cells 210 has high turbidity, a weak odor, and a low pH level respectively. The processor 230 may then cause the grey water dividing apparatus 120 to provide the grey water to the sedimentation tank 160 as denoted at 427 for turbidity treatment. The treated grey water may then be provided to the public sewage tank 170 as denoted 426.

In some illustrative embodiments, at blocks 416, 418, 421 (pH Is Bad), the processor 230 and the sensor unit 240 may determine that the grey water in one of the cells 210 has high turbidity, a weak odor, and a high pH level respectively. The processor 230 may then cause the grey water dividing apparatus 120 to provide the grey water to the pH adjustment tank 150 as denoted at 423 for pH treatment. In this embodiment, after being treated in the pH adjustment tank 150, the treated grey water is then provided to the deodorant tank 140 as denoted at 424 even though the grey water has a weak odor. The treated grey water may then be provided to the sedimentation tank 160 as denoted at 425 for turbidity treatment. The treated grey water may then be provided to the public sewage tank 170 as denoted 426.

In some illustrative embodiments, at blocks 416, 417 (Strong Odor), 419 (pH Is Bad), the processor 230 and the sensor unit 240 may determine that the grey water in one of the cells 210 has high turbidity, a strong odor, and a high pH level respectively. The processor 230 may then cause the grey water dividing apparatus 120 to provide the grey water to the pH adjustment tank 150 as denoted at 423 for pH treatment. The treated grey water is then provided to the deodorant tank 140 as denoted at 424 for odor treatment. The treated grey water may then be provided to the sedimentation tank 160 as denoted at 425 for turbidity treatment. The treated grey water may then be provided to the public sewage tank 170 as denoted 426.

In some illustrative embodiments, at blocks 416, 417, 420 (pH Is OK), the processor 230 and the sensor unit 240 may determine that the grey water in one of the cells 210 has high turbidity, a strong odor, and a low pH level respectively. The processor 230 may then cause the grey water dividing apparatus 120 to provide the grey water to the deodorant tank 140 as denoted at 424 for odor treatment. The treated grey water may then be provided to the sedimentation tank 160 as denoted at 425 for turbidity treatment. The treated grey water may then be provided to the public sewage tank 170 as denoted 426.

Figure 5:
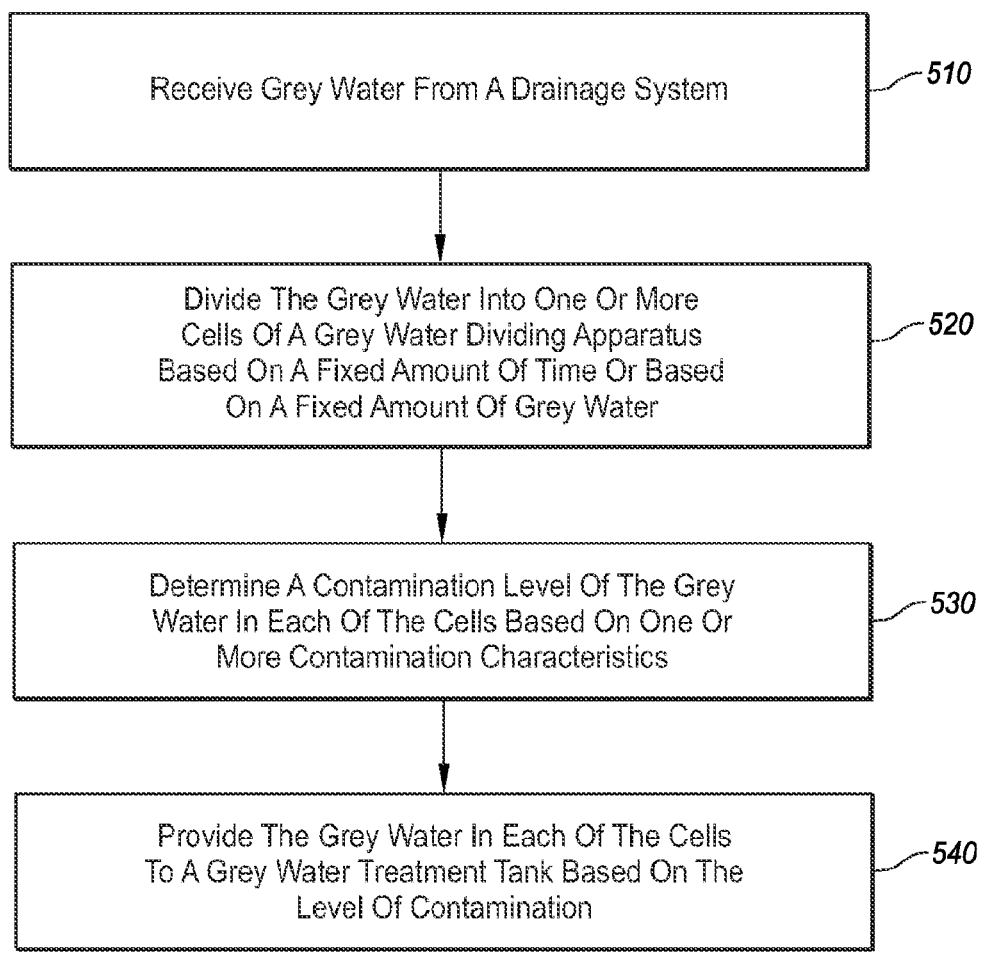
FIG. 5 shows an example flow diagram of a method for dividing and treating grey water.

FIG. 5 shows an example flow diagram of a method 500 for dividing and treating grey water, arranged in accordance with at least some embodiments described herein. In the illustrated embodiment, the method 500, and other methods and processes described herein, set forth various functional blocks or actions that may be described as processing steps, functional operations, events and/or acts, etc., which may be performed by hardware, software, and/or firmware. The method 500 includes one or more operations as illustrated by blocks 510, 520, 530, and/or 540. In block 510 (Receive Grey Water From A Drainage System), grey water from a drainage system is received. For example, in some illustrative embodiments, the grey water dividing apparatus 120 may receive the grey water from the drain system 110. As previously described the grey water may be generated by one or more of the grey water sources 111, 112, 113, or 114.

In block 520 (Divide The Grey Water Into One Or More Cells Of A Grey Water Dividing Apparatus Based On A Fixed Amount Of Time Or Based On A Fixed Amount Of Grey Water), the grey water is divided into one or more cells of a grey water dividing apparatus based on a fixed amount of time or based on a fixed amount of grey water. For example, in some illustrative embodiments, the grey water received from the drain system 110 may be divided into one or more of the cells 210a, 210b, 210c, 210d, 210e, and 210f of the grey water dividing apparatus 120. The processor 230 may determine how much grey water is to go into each of the cells 210a, 210b, 210c, 210d, 210e, and 210f based on the fixed amount of time or fixed amount of grey water. The fixed amount of time or fixed amount of grey water may be based on the relationships 235a as previously described.

In block 530 (Determine A Contamination Level Of The Grey Water In Each Of The Cells Based On One Or More Contamination Characteristics), a contamination level of the grey water in each of the cells based on one or more contamination characteristics is determined. For example, in some illustrative embodiments, the sensor unit 240 may measure one or more contamination characteristics including, but not limited to, turbidity, pH level, conductivity, absorption of light and odor. In some embodiments the sensor unit 240 may be a single sensor that measures all the contamination characteristics while in other embodiments the sensor unit 240 may include multiple sensors that each measure one or more of the contamination characteristics. The processor 230 may use the measured contamination characteristics to determine the contamination level of the grey water.

In block 540 (Provide The Grey Water In Each Of The Cells To A Grey Water Treatment Tank Based On The Level Of Contamination), the grey water in each of the cells is provided to a grey water treatment tank based on the level of contamination. For example, in some illustrative embodiments, the processor 230 causes the grey water dividing apparatus 120 to provide the grey water in each of the cells 210a, 210b, 210c, 210d, 210e, and 210f to one of the grey water treatment tanks 130, 140, 150, or 160 based on the contamination level determined in block 530. The treatment tanks 130, 140, 150, and 160 may then treat the grey water in a manner determined by the contamination characteristics. For example, the grey water treatment tank 140 may treat the grey water for odor, the grey water treatment tank 150 may adjust the pH level of the grey water, and the grey water treatment tank 160 may treat the grey water for sediments (turbidity). In some embodiments, the grey water that is treated in one grey water treatment tank may then be provided to a second grey water treatment tank for further treatment. The treated grey water may then be provided to the public sewage tank 170 for discharge into the public sewage system or to the water storage tank 130 for reuse.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
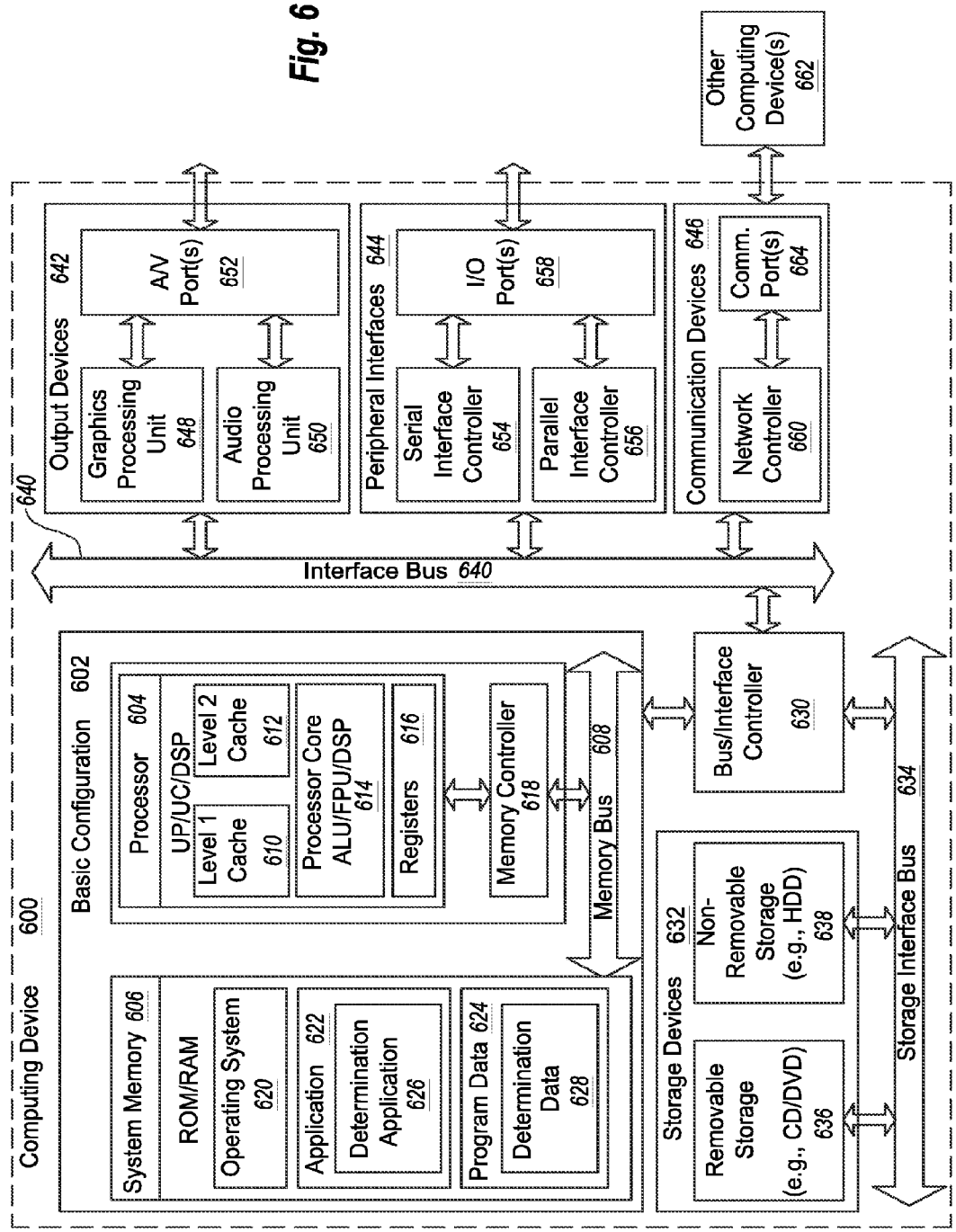
FIG. 6 shows an example computing device that is arranged to help treat grey water by determining a fixed amount of time or a fixed amount of grey water and by determining a contamination level; all arranged in accordance with at least some embodiments described herein.

FIG. 6 shows an example computing device 600 that is arranged to help treat grey water by determining a fixed amount of time or a fixed amount of grey water and by determining a contamination level, arranged in accordance with at least some embodiments described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to method 500 of FIG. 5. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A grey water dividing apparatus comprising:
   at least one input capable of receiving grey water from a drainage system;
   one or more cells coupled to the at least one input, the one or more cells being adapted to receive a portion of the received grey water based on a fixed amount of time or based on a fixed amount of grey water;
   a processor that is configured to determine the fixed amount of time or the fixed amount of grey water;
   a sensor unit, coupled to the one or more cells, that is configured to determine a contamination level of the grey water in each of the one or more cells; and
   at least one output, coupled to the one or more cells, the at least one output being adapted to provide the grey water received by the one or more cells to a grey water treatment system based on the determined contamination level of the grey water in each of the one or more cells.

2. The grey water dividing apparatus of claim 1, wherein the processor is configured to determine the fixed amount of time and the fixed amount of grey water based on historical contamination levels of the received grey water.

3. The grey water dividing apparatus of claim 1, wherein the sensor unit is configured to determine the contamination level by measuring a contamination characteristic comprising one or more of turbidity, pH level, conductivity, absorption of light and odor of the grey water in each of the one or more cells.

4. The grey water dividing apparatus of claim 1, wherein the sensor unit includes a plurality of sensors, each configured to measure a different contamination characteristic.

5. The grey water dividing apparatus of claim 1, wherein each of the one or more cells has its own input adapted to receive the grey water from the drainage system.

6. The grey water dividing apparatus of claim 1, wherein the at least one output comprises a plurality of outputs that are each coupled to a different treatment tank of the water treatment system.

7. The grey water dividing apparatus of claim 1, wherein the processor is configured to periodically update the fixed amount of time or the fixed amount of grey water based on the determined contamination level of the grey water in each of the one or more cells.

8. The grey water dividing apparatus of claim 1, wherein the processor, based on the determination of the contamination level for a particular one of the one or more cells, is configured to cause the grey water dividing apparatus to provide the grey water in the particular one of the one or more cells to the water treatment system configured for the contamination level of the particular one of the one or more cells.

9. A grey water dividing and treatment system comprising:
   a drain system adapted to receive grey water from a grey water producing source;
   a grey water dividing apparatus adapted to:
   divide the grey water received from the drain system into a plurality of cells, and
   determine a contamination level of the grey water in each of the plurality of cells; and
   one or more grey water treatment tanks adapted to:
   receive the grey water from the grey water dividing apparatus based on the determined contamination level of the grey water in each of the plurality of cells, and
   treat the grey water.

10. The grey water dividing and treatment system of claim 9, wherein the grey water producing source comprises one of a bath, a shower, a household sink, dishwasher, or a clothes washer.

11. The grey water dividing and treatment system of claim 9, wherein one of the one or more grey water treatment tanks comprises a water storage tank adapted to receive grey water from the grey water dividing apparatus when it is determined that the grey water in a particular one of the plurality of cells has a contamination level low enough such that the grey water can be reused.

12. The grey water dividing and treatment system of claim 11, further comprising a toilet coupled to the water storage tank, wherein the grey water in the water storage tank is reused in the toilet.

13. The grey water dividing and treatment system of claim 9, wherein one of the one or more grey water treatment tanks comprises a pH adjustment tank adapted to receive grey water from the grey water dividing apparatus when it is determined that the grey water in a particular one of the plurality of cells has a pH level that is higher than a predetermined acceptable level, wherein the pH adjustment tank is adapted to treat the pH level of the received grey water.

14. The grey water dividing and treatment system of claim 9, wherein the one or more grey water treatment tanks comprises a sensor adapted to further measure a contamination characteristic of the grey water received by the one or more grey water treatment tanks.

15. The grey water dividing and treatment system of claim 14, wherein the contamination characteristic measured by the sensor comprises one or more of turbidity, pH level, conductivity, absorption of light and odor of the grey water in the plurality of cells.

16. The grey water dividing and treatment system of claim 9, wherein a public sewage system is coupled to the one or more grey water treatment tanks and is configured to receive the grey water from the one or more grey water treatment tanks after the one or more grey water treatment tanks have treated the grey water.

17. A method for dividing and treating grey water, comprising:

receiving grey water from a drainage system;
dividing the grey water into one or more cells of a grey water dividing apparatus based on a fixed amount of time or based on a fixed amount of grey water;
determining a contamination level of the grey water in each of the cells based on one or more contamination characteristics; and
providing the grey water in each of the cells to a grey water treatment tank based on the determined level of contamination.

18. The method of claim 17, wherein the grey water treatment tank is a first grey water treatment tank, the method further comprising:

providing the grey water treated in the first grey water treatment tank to a second grey water treatment tank; and
additionally treating the grey water in the second grey water treatment tank in a manner determined by a second contamination characteristic that is different from the contamination characteristic treated in the first grey water treatment tank.

19. The method of claim 17, further comprising:

determining that all of the one or more contamination characteristics are within acceptable levels after treatment of the grey water; and
providing the grey water for reuse in an acceptable manner.

20. The method of claim 17, wherein the one or more contamination characteristics comprise at least one of turbidity, pH level, conductivity, absorption of light and odor.

\* \* \* \* \*

UNITED STATES PATENT AND TRADEMARK OFFICE
CERTIFICATE OF CORRECTION

PATENT NO. : 8,920,657 B2  
APPLICATION NO. : 13/203966  
DATED : December 30, 2014  
INVENTOR(S) : Kawasaki Page 1 of 1

It is certified that error appears in the above-identified patent and that said Letters Patent is hereby corrected as shown below:

In the Drawings,

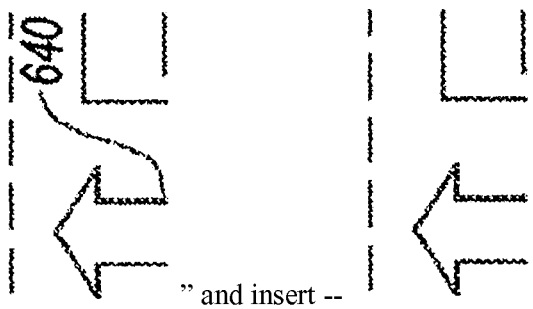

In Fig. 6, Sheet 6 of 6, delete " " and insert -- --, therefor.

In Fig. 6, Sheet 6 of 6, delete "UP/UC/DSP" and insert -- $\mu P/\mu C/DSP$ --, therefor.

In the Specification,

In Column 1, below Title, insert -- CROSS-REFERENCE TO RELATED APPLICATION The present application is a U.S. national stage filing under 35 U.S.C. §371 of International Application No. PCT/US2011/032903, filed on Apr. 18, 2011. --.

In Column 5, Line 53, delete "system 110" and insert -- system 100 --, therefor.

In Column 6, Line 20, delete "2100," and insert -- 210f), --, therefor.

In Column 19, Line 65, delete "and or" and insert -- and/or --, therefor.

Signed and Sealed this  
Fourteenth Day of July, 2015

Michelle K. Lee  
*Director of the United States Patent and Trademark Office*